US012615670B2

(12) United States Patent
Zhang et al.

(10) Patent No.: US 12,615,670 B2
(45) Date of Patent: Apr. 28, 2026

(54) METHODS AND APPARATUS FOR CONTROL INFORMATION CONFIGURATION IN WIRELESS COMMUNICATIONS

(71) Applicant: ZTE Corporation, Shenzhen (CN)

(72) Inventors: Junfeng Zhang, Shenzhen (CN); Weimin Li, Shenzhen (CN); Li Tian, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 365 days.

(21) Appl. No.: 17/716,899

(22) Filed: Apr. 8, 2022

(65) Prior Publication Data

US 2022/0232638 A1     Jul. 21, 2022

Related U.S. Application Data

(63) Continuation of application No. PCT/CN2019/110717, filed on Oct. 12, 2019.

(51) Int. Cl.
*H04W 74/0836* (2024.01)
*H04W 74/0833* (2024.01)

(52) U.S. Cl.
CPC .... *H04W 74/0836* (2024.01); *H04W 74/0833* (2013.01)

(58) Field of Classification Search
CPC ........................... H04W 74/0833; Y02D 30/70
See application file for complete search history.

(56) References Cited

U.S. PATENT DOCUMENTS

| | | | |
|---|---|---|---|
| 10,405,342 B2 | 9/2019 | Wang et al. | |
| 11,419,151 B2 | 8/2022 | Wang et al. | |
| 11,985,706 B2 * | 5/2024 | Jeon ................. | H04W 74/0833 |
| 11,997,710 B2 * | 5/2024 | Gao ...................... | H04W 48/12 |
| 12,035,372 B2 * | 7/2024 | Ohara ............... | H04W 74/0833 |
| 2013/0083739 A1 | 4/2013 | Yamada | |
| 2021/0345426 A1 | 11/2021 | Liu | |
| 2022/0070938 A1 * | 3/2022 | Wu ...................... | H04W 74/002 |
| 2023/0082436 A1 * | 3/2023 | Jung ................. | H04W 74/0838 |
| | | | 370/329 |

FOREIGN PATENT DOCUMENTS

| | | |
|---|---|---|
| CN | 109863817 A | 6/2019 |
| CN | 109892000 A | 6/2019 |

(Continued)

OTHER PUBLICATIONS

International Search Report and Written Opinion mailed on Jul. 13, 2020 for International Application No. PCT/CN2019/110717, filed on Oct. 12, 2019 (7 pages).

(Continued)

*Primary Examiner* — Joseph E Avellino
*Assistant Examiner* — Adam Joel Cerlanek
(74) *Attorney, Agent, or Firm* — Perkins Coie LLP.

(57)     ABSTRACT

A wireless communication method is provided to include: sending, by a user device, a first message to a network device in a wireless network to initiate a 2-step random access to the wireless network; and receiving, in response to the first message, a second message to perform the 2-step random access, the second message including a field indicating whether a transport block size of a payload of the second message is scaled.

11 Claims, 11 Drawing Sheets

(56)             References Cited

FOREIGN PATENT DOCUMENTS

| CN | 110115096 | A  | 8/2019  |
|----|-----------|----|---------|
| CN | 110312312 | A  | 10/2019 |
| WO | 2019086039 | A1 | 5/2019 |
| WO | 2019/195563 | A1 | 10/2019 |

OTHER PUBLICATIONS

Motorola Mobility et al., "2-step RACH procedure," 3GPP TSG RAN WG1 #98bis, Chongqing, China, R1-1911035, 6 pages, Oct. 14-20, 2019.

Taiwanese office action issued in TW Patent Application No. 109130486, dated May 16, 2024, 36 pages. English translation included.

3GPP TS 38.321 V15.7.0 (Sep. 2019), Technical Specification, 3rd Generation Partnership Project; Technical Specification Group Radio Access Network; NR; Medium Access Control (MAC) protocol specification (Release 15), 77 pages.

Nokia et al., "Feature lead summary #4 on 2 step RACH procedures," 3GPP TSG RAN WG1 #98, R1-1909775, Prague, Czech Republic, Aug. 26-30, 2019, 57 pages.

Taiwanese Notice of Allowance issued in TW Patent Application No. 109130486, dated Jan. 23, 2025, 4 pages. English translation included.

Chinese office action issued in CN Patent Application No. 201980100305.0, dated Oct. 30, 2024, 13 pages. English translation included.

Chinese Notification to Complete Formalities of Registration issued in CN Patent Application No. 201980100305.0, dated Mar. 13, 2025, 4 pages. English translation included.

* cited by examiner

210

240

Processor Electronics

220

Transceiver Electronics

230

UE eNode B

Random Access Preamble

1

Random Access Response

2

L2/L3 message

3

Message for early contention resolution

4

Function elements of msgB

MAC PDU structure of msgB PDSCH

| | Number of bits | DCI format 1_0 with CRC scrambled by RA-RNTI | DCI format 1_0 with CRC scrambled by TC-RNTI | DCI format 1_0 with CRC scrambled by msgB-RNTI | DCI format 1_0 with CRC scrambled by C-RNTI (not for PDCCH order RA) |
|---|---|---|---|---|---|
| Identifier for DCI formats | 1 | reserved | ☑ | ☑ | ☑ |
| Frequency domain resource assignment | Related to BWP | ☑ | ☑ | ☑ | ☑ |
| Time domain resource assignment | 4 | ☑ | ☑ | ☑ | ☑ |
| VRB-to-PRB mapping | 1 | ☑ | ☑ | ☑ | ☑ |
| Modulation and coding scheme | 5 | ☑ | ☑ | ☑ | ☑ |
| New data indicator | 1 | reserved | ☑ | ☑ | ☑ |
| Redundancy version | 2 | reserved | ☑ | ☑ | ☑ |
| HARQ process number | 4 | reserved | ☑ | ☑ | ☑ |
| Downlink assignment index | 2 | reserved | reserved | reserved, could be reinterpreted as TB scaling | ☑ |
| TPC command for scheduled PUCCH | 2 | reserved | ☑ | ☑ Or reserved, could be reinterpreted as TB scaling | ☑ |
| PUCCH resource indicator | 3 | reserved | ☑ | ☑ | ☑ |
| PDSCH-to-HARQ_feedback timing indicator | 3 | reserved | ☑ | ☑ | ☑ |
| TB scaling | | ☑ | | | |

FIG. 7

| | | |
|---|---|---|
| Reserved | | OCT1 |
| Timing advance command | | |
| Timing advance command | PUCCH TPC | OCT2 |
| Contention resolution ID | | OCT3 |
| Contention resolution ID | | OCT4 |
| Contention resolution ID | | OCT5 |
| Contention resolution ID | | OCT6 |
| Contention resolution ID | | OCT7 |
| Contention resolution ID | | OCT8 |
| C-RNTI | | OCT9 |
| C-RNTI | | OCT10 |

Example of SuccessRAR structure

FIG. 8

| | Number of bits | DCI format 1_0 with CRC scrambled by RA-RNTI | DCI format 1_0 with CRC scrambled by TC-RNTI | DCI format 1_0 with CRC scrambled by msgB-RNTI | DCI format 1_0 with CRC scrambled by C-RNTI (not for PDCCH order RA) |
|---|---|---|---|---|---|
| Identifier for DCI formats | 1 | reserved | ☑ | ☑ | ☑ |
| Frequency domain resource assignment | Related to BWP | ☑ | ☑ | ☑ | ☑ |
| Time domain resource assignment | 4 | ☑ | ☑ | ☑ | ☑ |
| VRB-to-PRB mapping | 1 | ☑ | ☑ | ☑ | ☑ |
| Modulation and coding scheme | 5 | ☑ | ☑ | ☑ | ☑ |
| New data indicator | 1 | reserved | ☑ | ☑ Or reserved | ☑ |
| Redundancy version | 2 | reserved | ☑ | ☑ Or reserved | ☑ |
| HARQ process number | 4 | reserved | ☑ | ☑ Or reserved | ☑ |
| Downlink assignment index | 2 | ☒ | reserved | ☒ | ☑ |
| TPC command for scheduled PUCCH | 2 | reserved | ☑ | ☑ Or reserved | ☑ |
| PUCCH resource indicator | 3 | reserved | ☑ | ☑ Or reserved | ☑ |
| PDSCH-to-HARQ_feedback timing indicator | 3 | reserved | ☑ | ☑ Or reserved | ☑ |
| TB scaling | | ☑ | | ☑ | |

Figure 10:
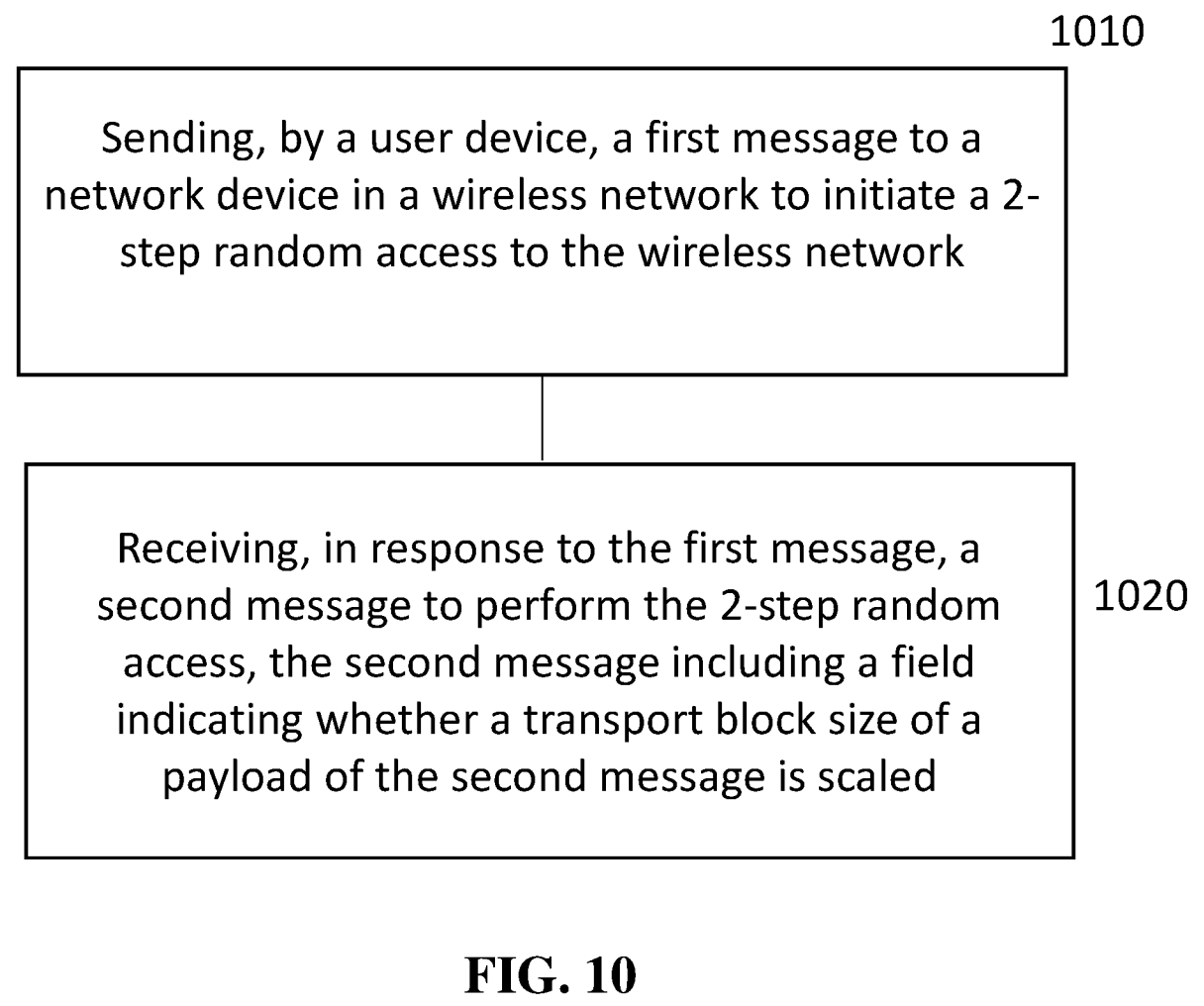

Sending, by a user device, a first message to a network device in a wireless network to initiate a 2-step random access to the wireless network

1020

Receiving, in response to the first message, a second message to perform the 2-step random access, the second message including a field indicating whether a transport block size of a payload of the second message is scaled

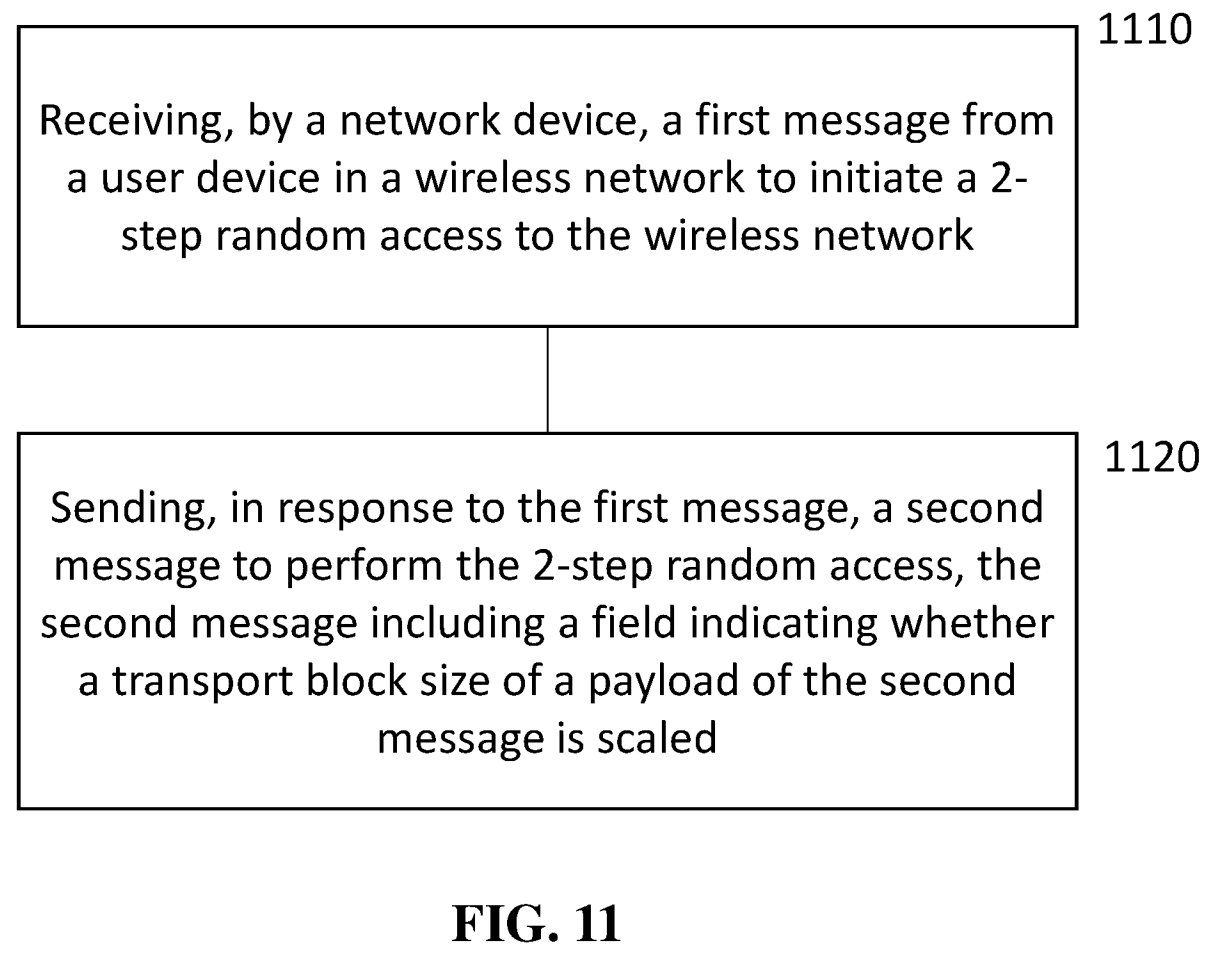

Receiving, by a network device, a first message from a user device in a wireless network to initiate a 2-step random access to the wireless network

1120

Sending, in response to the first message, a second message to perform the 2-step random access, the second message including a field indicating whether a transport block size of a payload of the second message is scaled

FIG. 11

METHODS AND APPARATUS FOR CONTROL INFORMATION CONFIGURATION IN WIRELESS COMMUNICATIONS

CROSS-REFERENCE TO RELATED APPLICATIONS

This application is a continuation of International Patent Application No. PCT/CN2019/110717, filed on Oct. 12, 2019, the contents of which are incorporated herein by reference in their entirety.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for control information configuration in wireless communications.

In one aspect, a wireless communication method is disclosed. The wireless communication method is provided to include sending, by a user device, a first message to a network device in a wireless network to initiate a 2-step random access to the wireless network; and receiving, in response to the first message, a second message to perform the 2-step random access, the second message including a field indicating whether a transport block size of a payload of the second message is scaled.

In another aspect, a wireless communication method is disclosed. The wireless communication method is provided to include receiving, by a network device, a first message from a user device in a wireless network to initiate a 2-step random access to the wireless network; and sending, in response to the first message, a second message to perform the 2-step random access, the second message including a field indicating whether a transport block size of a payload of the second message is scaled.

In another aspect, a wireless communication apparatus comprising a processor configured to perform the disclosed methods is disclosed.

In another aspect, a computer readable medium having code stored thereon is disclosed. The code, when implemented by a processor, causes the processor to implement a method described in the present document.

These, and other features, are described in the present document.

BRIEF DESCRIPTION OF THE DRAWING

FIG. 7 shows an example of a table illustrating DCI (Downlink Control Information) formats.

FIG. 8 shows an example of SuccessRAR structure included in the msgB PDSCH.

FIG. 9 shows an example of a table illustrating DCI formats.

FIGS. 10 and 11 show example flowcharts of wireless communication methods based on some implementations of the disclosed technology.

DETAILED DESCRIPTION

The disclosed technology provides implementations and examples of control information configuration in wireless communications. In some implementations, the suggested control information configuration enables the two-step random access procedures between a user device and a network device. While 5G terminology is used in some cases to facilitate understanding of the disclosed techniques, which may be applied to wireless systems and devices that use communication protocols other than 5G or 3GPP protocols.

In the 5th Generation (5G) New Radio (NR) mobile networks, a user equipment (UE) is required to obtain uplink timing synchronization and downlink timing synchronization with a base station (BS) before a user equipment (UE) can send data to a base station (BS). The uplink timing synchronization can be achieved by performing a random access procedure (RACH). The random access procedure is to be provided to meet the demand for faster and efficient communications. This document proposes various configuration schemes for downlink control information in wireless communications.

Figure 1:
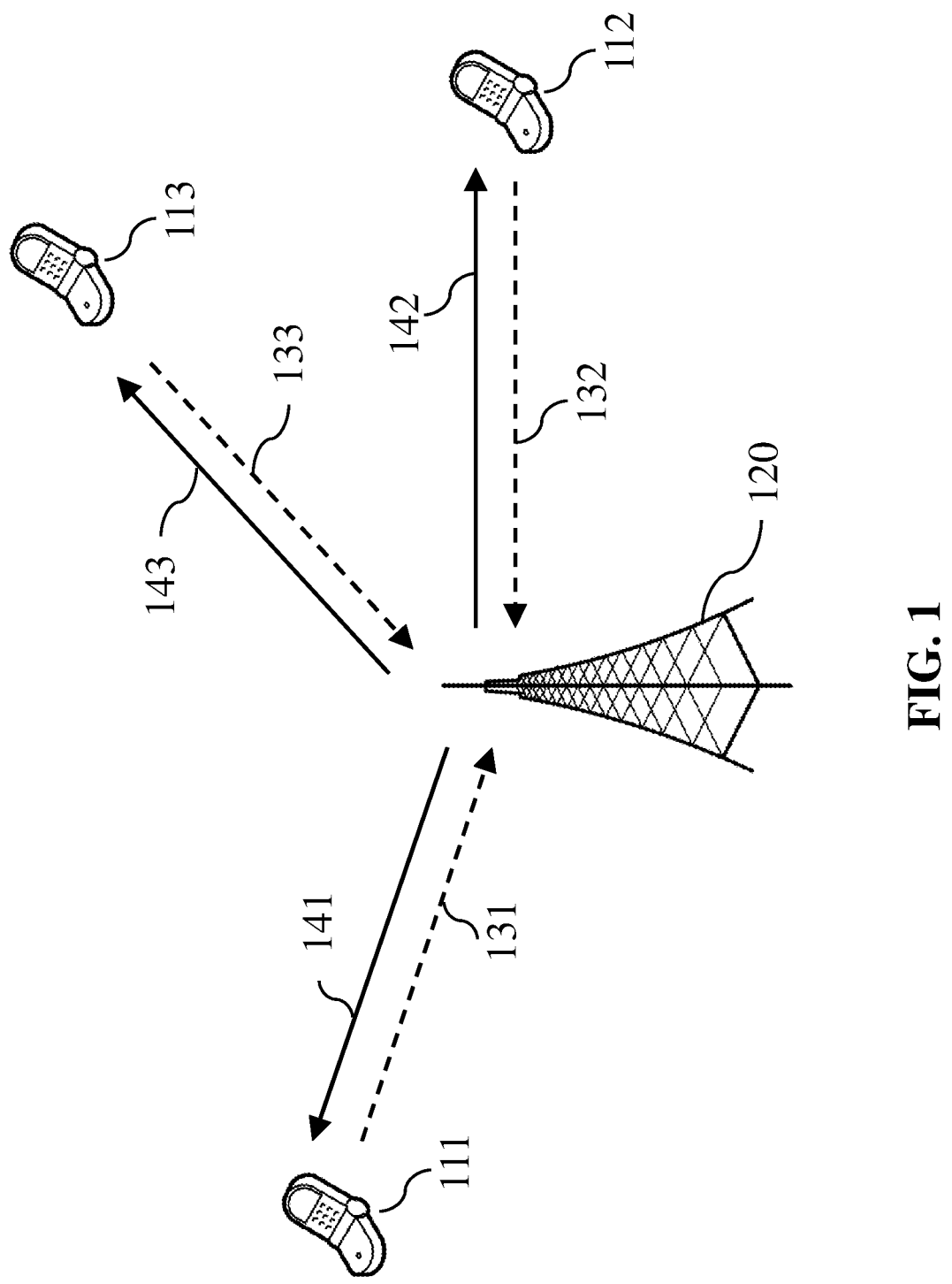
FIG. 1 shows an example of wireless communication including a base station (BS) and user equipment (UE) based on some implementations of the disclosed technology.

FIG. 1 shows an example of a wireless communication system (e.g., a 5G or NR cellular network) that includes a BS 120 and one or more user equipment (UE) 111, 112 and 113. In some embodiments, the UEs access the BS (e.g., the network) using implementations of the disclosed technology (131, 132, 133), which then enables subsequent communication (141, 142, 143) from the BS to the UEs. The UE may be, for example, a smartphone, a tablet, a mobile computer, a machine to machine (M2M) device, an Internet of Things (IoT) device, and so on. Although FIG. 1 shows the BS 120, other network side communication nodes can be implemented to communicate with the UE. For example, the network side communication node or the BS 102 can include a node B, an E-UTRA Node B (also known as Evolved Node B, eNodeB or eNB), a gNodeB (also known as gNB) in new radio (NR) technology, a pico station, a femto station, or others.

Figure 2:
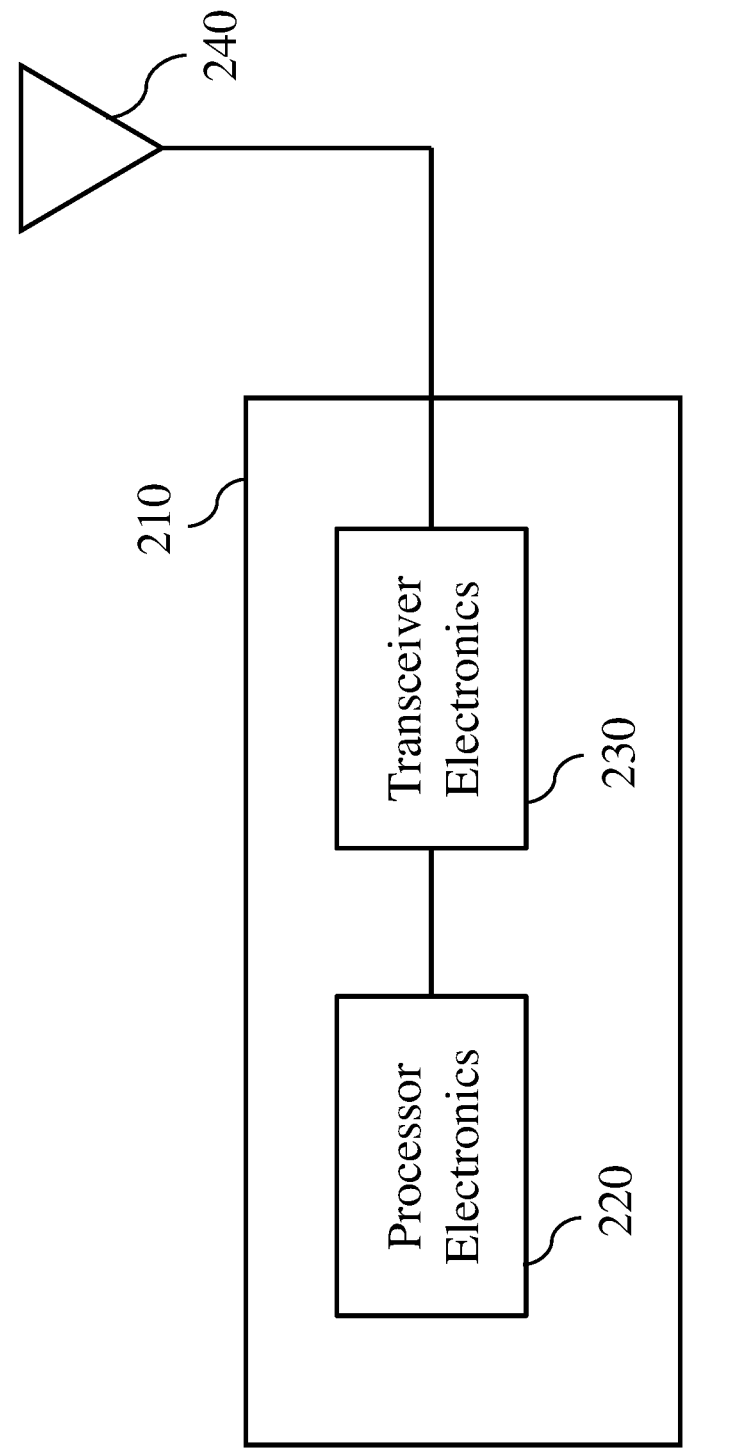
FIG. 2 shows an example of a block diagram of a portion of an apparatus based on some implementations of the disclosed technology.

FIG. 2 shows an example of a block diagram representation of a portion of an apparatus. An apparatus 210 such as a base station or a wireless device (or UE) can include processor electronics 220 such as a microprocessor that implements one or more of the techniques presented in this document. The apparatus 210 can include transceiver electronics 230 to send and/or receive wireless signals over one or more communication interfaces such as antenna 240. The apparatus 210 can include other communication interfaces for transmitting and receiving data. The apparatus 210 can include one or more memories (not explicitly shown) configured to store information such as data and/or instructions. In some implementations, the processor electronics 220 can include at least a portion of transceiver electronics 230. In some embodiments, at least some of the disclosed techniques, modules or functions are implemented using the apparatus 210.

Figure 3:
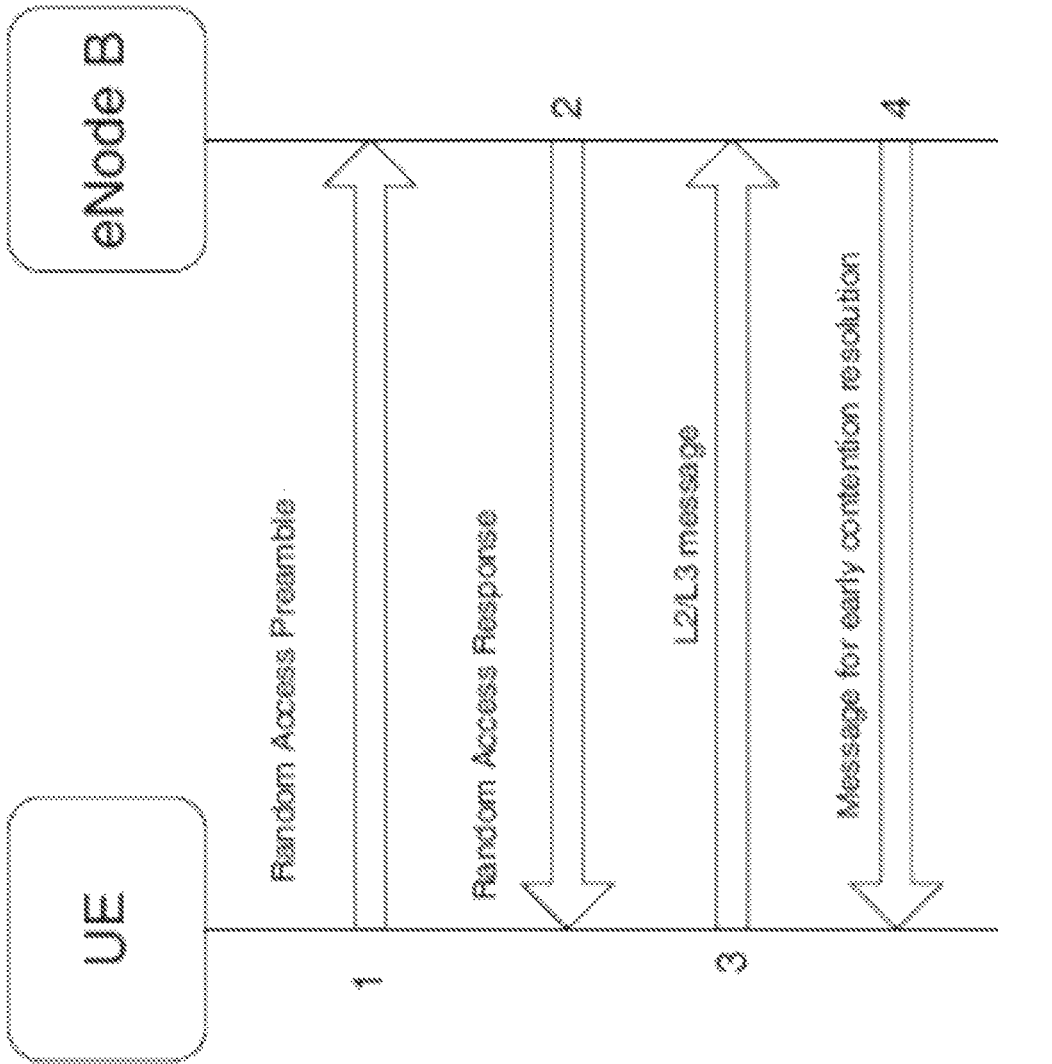
FIG. 3 shows a contention-based four-step random access procedure between a user equipment and a network side communication node.

The traditional contention-based RACH procedure for NR is the four-step RACH. FIG. 3 shows a contention-based four-step random access procedure between the UE and the network side communication node (e.g., eNode B). At the first step, the UE sends a RACH preamble (msg1) to a network device. At the second step, in response to the RACH preamble, the network device sends a random access response (msg2). At the third step, the UE sends Layer 2/Layer 3 (L2/L3) message (msg3) to the network. At the fourth step, the network sends the contention resolution message (msg4) to the UE. Since the traditional contention-based RACH procedure requires four steps, the latency can become a problem. Thus, a two-step RACH, which can significantly reduce the overall initial access latency, is getting more attention recently.

Figure 4:
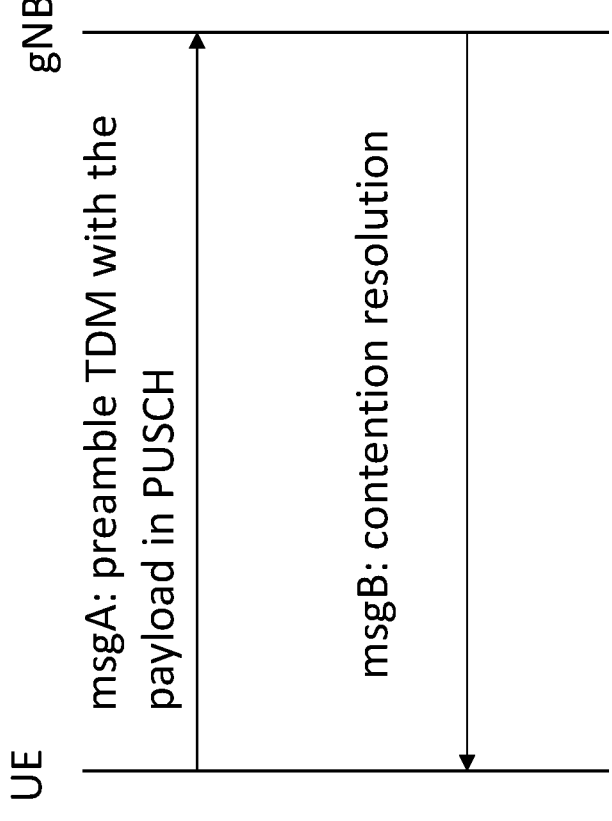
FIG. 4 shows an example of a two-step random access procedure between a user equipment and a network side communication node.

FIG. 4 shows an example of a two-step RACH process between a UE and a network side communication node (e.g., gNB). At the first step of the two-step RACH process, a first message (msgA) is transmitted from the UE to gNB. At the second step of the two-step RACH process, a second message (msgB) is transmitted from gNB to the UE. The msgA of the two-step RACH merges the contents of the msg1 and the msg3 of the contention-based four-step RACH, and the msgB of two-step RACH merges the contents of msg2 and msg4 of the contention-based four-step RACH. The channel structure of msgA corresponds to a preamble with a PUSCH (Physical Uplink Shared Channel) carrying payload which includes at least the content of msg3 in the traditional 4-step RACH. In some implementations, the payload may include a contention resolution ID and others in IDLE or inactive mode. In some implementations, the payload may include at least the UE's C-RNTI (Cell-Radio Network Temporary Identifier) in connected mode. The content of the msgB may include the contents of msg2 and msg4 of the contention-based four-step RACH and the msgB is configured to handle the contention resolution function for 2-step RACH.

In some implementations, during the two-step RACH, the gNB transmits the msgB which includes the physical downlink control channel (PDCCH) and physical downlink shared channel (PDSCH). The msgB PDSCH may be scheduled by the DCI (Downlink Control Information) of msgB PDCCH. The msgB PDCCH and msgB PDSCH are PDCCH and PDSCH that are associated with the msgB. The msgB PDCCH is addressed or associated with a msgB radio network temporary identifier (msgB-RNTI) or the UE's C-RNTI which has transmitted the msgA at the first step of the two-step RACH. In some implementations, the msgB PDCCH is scrambled by the msgB-RNTI or C-RNTI. The msgB-RNTI may be a random access RNTI (RA-RNTI) or a new RNTI which is separated from the traditional message 2 RA-RNTI. MsgB will be sent from the gNB to the UE if the preamble in msgA has been detected by the gNB. Depending on whether the payload in msgA has been successfully decoded, the content of msgB which embedded in the msgB PDSCH may be different.

Figure 5:
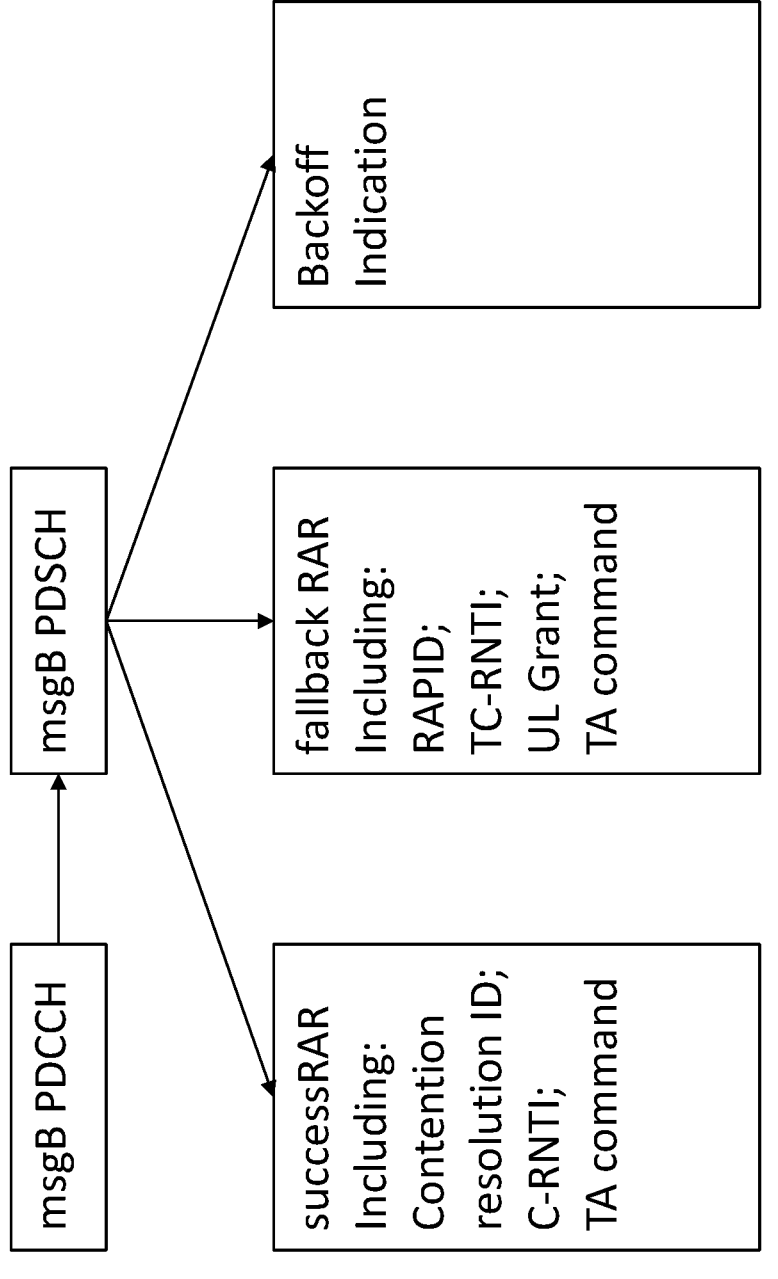
FIG. 5 shows examples of contents included in the msgB PDSCH.

The msgB PDSCH may include three kinds of function elements: 'SuccessRAR', 'FallbackRAR', or 'Backoff indicator (BI).' The SuccessRAR is a random access response after the msgA PUSCH has been successfully received and decoded by the base station. The FallbackRAR is a random access response after the preamble sequence in the msgA is successfully received by the base station but the PUSCH has been unsuccessfully decoded by the base station. The Backoff indicator is a general back-off indication which has the same function as the LTE backoff indicator. FIG. 5 shows examples of contents included in the msgB PDSCH including success RAR, fallback RAR, and backoff indicator. For the case both the msgA preamble and payload are successfully detected and decoded, the SuccessRAR in the msgB may include contention resolution ID which is transmitted in msgA, C-RNTI assigned for the UE or TA command. For the case that the preamble is successfully detected but the payload in PUSCH is not successfully decoded, the RACH procedure will fall back to traditional four-step RACH. The FallbackRAR could be identical to legacy msg2 which includes three fields: TC-RNTI, UL grant and TA command. Or RAPID will be added into FallbackRAR in addition with the previous three fields. In traditional 4-step RACH, the RAPID (Random Access Preamble Identifier) is included in the msg2 MAC subheader.

Figure 6:
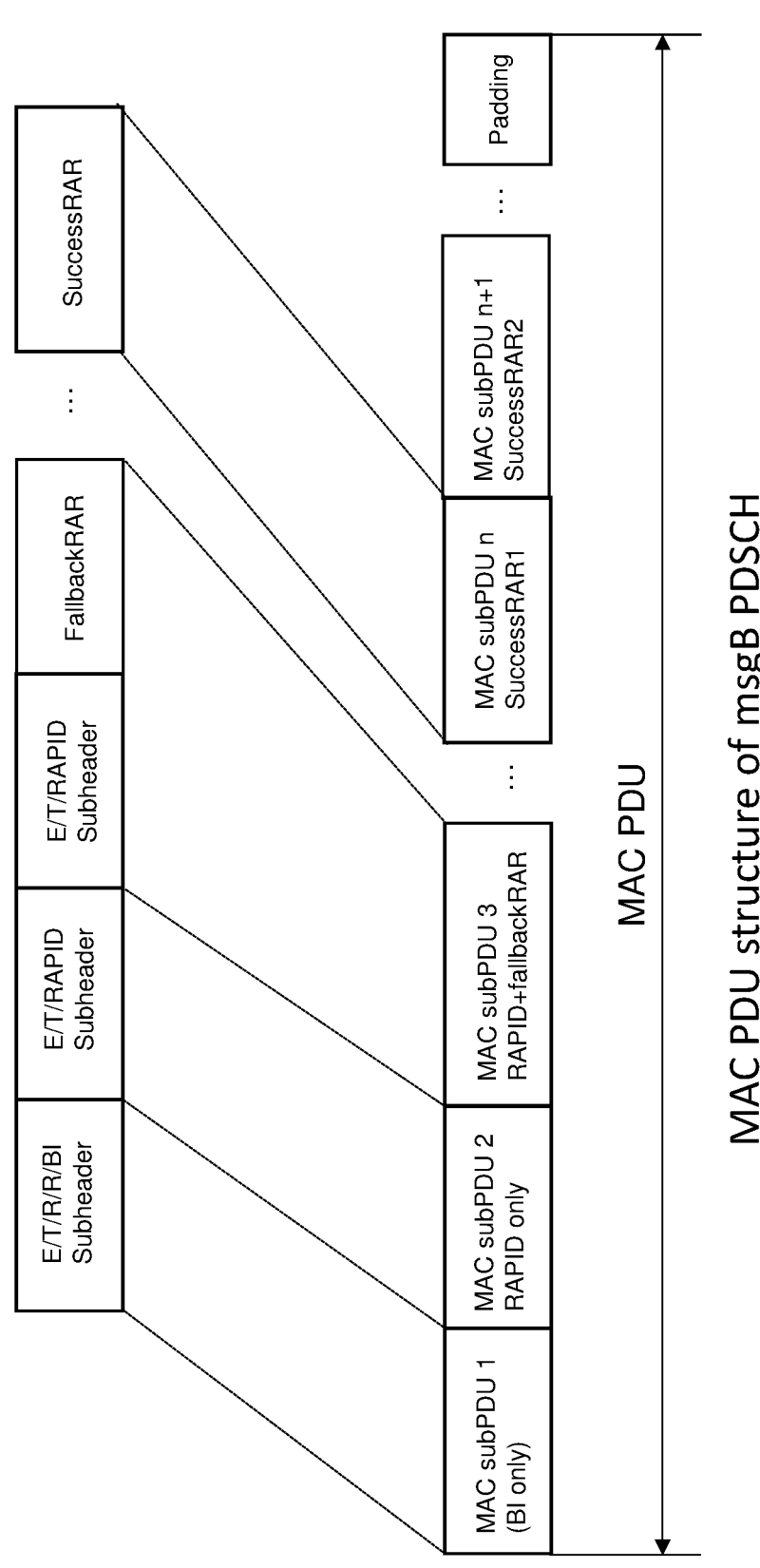
FIG. 6 shows an example of MAC (Medium Access Control) structure of msgB PDSCH.

The msgB PDSCH may contains the SuccessRAR, FallbackRAR, or Backoff indicator together or any combination of the three function elements. FIG. 6 shows an example of a MAC (Medium Access Control) PDU (Protocol Data Unit) structure of msgB PDSCH. In FIG. 6, the MAC PDU includes multiple MAC subPDUs (e.g., MACsubPDU1 to MACsubPDU n+1) which carry different types of MAC subheader and/or different types of MAC RAR (SuccessRAR or FallbackRAR). FIG. 6 shows the example only and thus the order and the contents of the msgB PDSCH are not limited to this example. In some implementations, there can be multiple SuccessRARs multiplexed in one msgB for multiple UEs. And it is also possible to include the FallbackRARs for one or a group of UEs identified by the same msgB RA-RNTI. The Backoff indicator can be carried in the MAC subheader.

The HARQ (Hybrid Automatic Repeat Request)-ACK feedback for the UE reception of SuccessRAR in msgB is needed to indicate that the successRAR has been successfully received by the corresponding UE which identified by the Contention resolution ID. When the HARQ-ACK is received by gNB, gNB will not retransmit the msgB for the UEs which feedback the ACK.

The UE my need to feedback the ACK by using the PUCCH resources. The PUCCH related resources may be indicated by the msgB PDCCH or msgB PDSCH in addition to some configurations in system information. The DCI format 1-0 for scheduling the PDSCH can be reused for msgB PDCCH. The DCI in DCI format 1-0 for msg2 of the tradition 4-step RACH is CRC (Cyclic Redundancy Check) scrambled by RA-RNTI, and the DCI in DCI format 1-0 for msg4 of the tradition 4-step RACH is CRC scrambled by TC-RNTI or C-RNTI. The supported DCI which is carried by the DCI format 1-0 scrambled by different RNTI are shown in the table in FIG. 7.

FIG. 7 shows four different DCI formats that are respectively scrambled by RA-RNTI, TC-RNTI, msgB-RNTI, and C-RNTI. Among the four DCI formats shown I FIG. 7, the DCI format scrambled by msgB-RNTI is used to implement the 2-step random access as suggested in some implementations of the disclosed technology. In FIG. 7, the DCI format scrambled by msgB-RNTI is illustrated with the concept of the reinterpretation as compared to the interpretations of corresponding fields in the DCI formats scrambled by RA-RNTI, TC-RNTI, and C-RNTI. From FIG. 7, it is observed that the DCI format 1_0 with CRC scrambled by TC-RNTI or C-RNTI has the fields of PUCCH resource indication such as: PUCCH resource indicator, TPC command for scheduled PUCCH, PDSCH-to-HARQ_feedback timing indicator, and the fields of HARQ indication for downlink msgB such as: new data indicator, redundancy version, HARQ process number. The two fields are needed for PUCCH transmission and msgB retransmission. Thus, the msgB PDCCH DCI is better to reuse all the fields in DCI format 1-0 CRC scrambled by TC-RNTI or C-RNTI but CRC scrambling sequence is replaced by msgB-RNTI. Furthermore, some revision or supplement based on the fields in DCI format 1-0 CRC scrambled by TC-RNTI or C-RNTI may be needed for msgB PDCCH DCI format.

The DCI format 1-0 CRC scrambled by C-RNTI for the 2-step RACH msgB PDCCH is valid in the case that the msgA transmitted with C-RNTI in PUSCH. If msgA is transmitted with contention resolution ID in PUSCH, the msgB PDCCH DCI could be modified based on the DCI format 1-0 CRC scrambled by TC-RNTI.

As previously mentioned, in some implementations, there may be multiple SuccessRARs multiplexed in one msgB for multiple UEs. And the HARQ-ACK feedback carried in PUCCHs for reception of SuccessRARs are needed. The field of "TPC command for scheduled PUCCH" in DCI format 1-0 CRC scrambled by TC-RNTI may be used for only one UE TPC command indication, not for multiple UEs. The total number of bits in DCI is limited and not allowed to change as the backward compatible reason, so a better way to indicate multiple UE's PUCCH TPC command is to include the 2 bit TPC command per UE in the content of successRAR of each specific UE. For example, in FIG. 8, 2 bits in successRAR structure are provided for "TPC command for scheduled PUCCH." The 2 bits of "TPC command for scheduled PUCCH" in DCI format 1-0 CRC scrambled by msgB-RNTI can be reserved or left empty.

From FIG. 7, it is also observed that the TB scaling field in DCI format 1-0 CRC scrambled by RA-RNTI is absent in the DCI format 1-0 CRC scrambled by msgB-RNTI (or TC-RNTI). The TB scaling is an important parameter for downlink initial access message. TB scaling is configured to scale the transport block (TB) size of downlink payload of initial access message for the purpose of reducing the code rate and improving the robustness of downlink signaling reception. It would be very beneficial that this TB scaling information is included as the DCI information for msgB. In some implementations, the TB scaling information includes i) whether the TB size of the payload of the msgB is scaled. In some implementation, the TB scaling information further includes how to scale the msgB, e.g., the scaling factor. The typical TB scaling factor can be set such that 00 indicates 100%, 01 indicates 50%, and 10 indicates 25%.

To include the TB scaling information, some reserved bits or empty bits in DCI format 1-0 CRC scrambled by msgB-RNTI for msgB can be reinterpreted as the TB scaling field. As the example, the table as shown in FIG. 7 shows that the reserved 2 bits for "Downlink assignment index" or the reserved bits "TP Command for scheduled PUCCH" can be reinterpreted as the TB scaling field. When the structure (e.g., the fields with the specific function in DCI format and the value range of each fields) of DCI format 1-0 CRC scrambled by msgB-RNTI is modified from that of the legacy format, corresponding fields, for example, "Downlink assignment index" or the reserved bits "TP Command for scheduled PUCCH," in DCI format 1-0 CRC scrambled by msgB-RNTI is reserved. In this case, the reserved bits in the corresponding fields can be reinterpreted as the TB scaling field. In some implementation, when the structure of DCI format 1-0 CRC scrambled by msgB-RNTI is same as that of the legacy format, corresponding fields, for example, "Downlink assignment index" or the reserved bits "TP Command for scheduled PUCCH," in DCI format 1-0 CRC scrambled by msgB-RNTI is not reserved. In this case, the reserved bits in the corresponding fields can be reinterpreted as the TB scaling field. "Downlink assignment index" is original as the counter of DAI (Downlink Assignment Index) but not really used in DCI format 1-0 CRC scrambled by msgB-RNTI.

If the "TPC command for scheduled PUCCH" per UE is indicated in each UE's successRAR, the 2 bits of TPC command for scheduled PUCCH in DCI can be reserved and reinterpreted as the TB scaling field.

In case that the successRAR in msgB is transmitted with SRB (Signaling Radio Bear) data, it is not allowed to multiplex multiple UEs successRARs in msgB. In this case, the "TPC command for scheduled PUCCH" in DCI information can be maintained in DCI and doesn't need to be reserved.

In case that the successRAR in msgB is transmitted without SRB data, it is allowed to multiplex multiple UEs successRARs in msgB. In this case, the "TPC command for scheduled PUCCH" in DCI can be either reserved or kept in DCI information. If this field in DCI is kept, it is not mandatory that the "TPC command for scheduled PUCCH" is provided in all successRARs in one msgB. At least one UE's "TPC command for scheduled PUCCH" is provided in DCI and other's "TPC command for scheduled PUCCH" is provided in successRARs.

FIG. 9 shows an example of a table illustrating a DCI format. Compared to the table in FIG. 7 in which the reinterpretation of some fields is illustrated for the DCI format with CRC scrambled by msgB-RNTI, the DCI format shown in FIG. 9 shows the final fields included in the DCI format with CRC scrambled by msgB-RNTI. In FIG. 9, the structure of the DCI format 1_0 with CRC scrambled by msgB-RNTI includes the identifier for DCI format, frequency domain resource assignment, time domain resource assignment, VRB-to-PRB mapping, Modulation and coding scheme and TB scaling. And other fields just like new data indicator, Redundancy version, HARQ process number, TPC command for scheduled PUCCH, PUCCH resource indicator, PDSCH-to-HARQ_feedback timing indicator could be optionally included in the structure or be reserved in the structure. The structure of the DCI format means fields with the specific function in DCI format and the number of bits in each field. The sequence or order of each field is not included in the definition of structure and thus can be changed in various manners. Downlink assignment index is not used for DCI format 1_0 with CRC scrambled by msgB-RNTI. In some implementations, the same payload size with other legacy DCI format 1_0 can be maintained in the DCI format.

FIG. 10 shows an example of a wireless communication scheme based on some implementations of the disclosed technology. At step 1010, the method includes sending, by a user device, a first message to a network device in a wireless network to initiate a 2-step random access to the wireless network. At step 1020, the method includes receiving, in response to the first message, a second message to perform the 2-step random access, the second message including a field indicating whether a transport block size of a payload of the second message is scaled.

FIG. 11 shows another example of a wireless communication scheme based on some implementations of the disclosed technology. At step 1110, the method includes receiving, by a network device, a first message from a user device in a wireless network to initiate a 2-step random access to the wireless network. At step 1120, the method includes sending, in response to the first message, a second message to perform the 2-step random access, the second message including a field indicating whether a transport block size of a payload of the second message is scaled.

Additional features of the above-described methods/techniques that may be preferably implemented in some implementations are described below using a clause-based description format.

1. A wireless communication method, including: sending, by a user device, a first message to a network device in a wireless network to initiate a 2-step random access to the wireless network; and receiving, in response to the first message, a second message to perform the 2-step random access, the second message including a field indicating whether a transport block size of a payload of the second message is scaled. The network device may include the BS 120 as shown in FIG. 1 and the user device may include the UE as shown in FIG. 1. In some implementations, the 2-step random access to the wireless network is shown in FIG. 4. Examples of the field indicating whether the transport block size of the payload of the second message is scaled are discussed with reference to FIGS. 7-9.

2. The wireless communication method of clause 1, wherein the field is at a position in the second message at which a legacy format comprises a reserve bit or an empty bit.

3. The wireless communication method of clause 1, wherein the field further indicates a scaling factor for the second message.

4. The wireless communication method of clause 1, wherein the second message is scrambled by a first identifier specific to the second message.

5. The wireless communication method of clause 2, wherein the second message includes downlink control information having a different structure from that of the legacy format.

6. The wireless communication method of clause 2, wherein the second message includes downlink control information having a same structure as that of the legacy format.

7. The wireless communication method of clause 4, wherein the first identifier is msgB-RNTI (Radio Network Temporary Identifier).

8. The wireless communication method of clause 5 or 6, wherein the legacy format is scrambled by a RA (Random Access)-RNTI, TC (Temporary Cell)-RNTI, or C (Cell)-RNTI.

9. The wireless communication method of clause 1, wherein the second message includes a PDCCH (Physical Downlink Control Channel) and PDSCH (Physical Downlink Shared Channel).

10. The wireless communication method of clause 9, wherein the PDSCH includes at least one of a first element corresponding to a response to a reception of a PUSCH (Physical Uplink Shared Channel) included in the first message and a successful decoding of the PUSCH, a second element corresponding to a response to a reception of a preamble sequence in the first message but an unsuccessful decoding of the PUSCH, or a third element corresponding to a back-off indication.

11. The wireless communication method of clause 10, wherein the first element includes at least one of a contention resolution ID, C-RNTI assigned for the user device, or a TA (Timing Advance) command.

12. The wireless communication method of clause 10, wherein the second element includes at least one of a preamble identifier, TC_RNTI, UL (uplink) Grant, or a TA command.

13. The wireless communication method of clause 10, wherein the PDSCH includes a mac structure including multiple MAC sub PDUs.

14. A wireless communication method, including: receiving, by a network device, a first message from a user device in a wireless network to initiate a 2-step random access to the wireless network; and sending, in response to the first message, a second message to perform the 2-step random access, the second message including a field indicating whether a transport block size of a payload of the second message is scaled. The network device may include the BS 120 as shown in FIG. 1 and the user device may include the UE as shown in FIG. 1. In some implementations, the 2-step random access to the wireless network is shown in FIG. 4. Examples of the field indicating whether the transport block size of the payload of the second message is scaled are discussed with reference to FIGS. 7-9.

15. The wireless communication method of clause 14, wherein the field is at a position in the second message at which a legacy format comprises a reserve bit or an empty bit.

16. The wireless communication method of clause 14, wherein the field further indicates a scaling factor for the second message.

17. The wireless communication method of clause 14, wherein the second message is scrambled by a first identifier specific to the second message.

18. The wireless communication method of clause 15, wherein the second message includes downlink control information having a different structure from that of the legacy format.

19. The wireless communication method of clause 15, wherein the second message includes downlink control information having a same structure as that of the legacy format.

20. The wireless communication method of clause 17, wherein the first identifier is msgB-RNTI (Radio Network Temporary Identifier).

21. The wireless communication method of clause 18 or 19, wherein the legacy format is scrambled by a RA (Random Access)-RNTI, TC (Temporary Cell)-RNTI, or C (Cell)-RNTI.

22. The wireless communication method of clause 14, wherein the second message includes a PDCCH (Physical Downlink Control Channel) and PDSCH (Physical Downlink Shared Channel).

23. The wireless communication method of clause 22, wherein the PDSCH includes at least one of a first element corresponding to a response to a reception of a PUSCH (Physical Uplink Shared Channel) included in the first message and a successful decoding of the PUSCH, a second element corresponding to a response to a reception of a preamble sequence in the first message but an unsuccessful decoding of the PUSCH, or a third element corresponding to a back-off indication.

24. The wireless communication method of clause 23, wherein the first element includes at least one of a contention resolution ID, C-RNTI assigned for the user device, or a TA (Timing Advance) command.

25. The wireless communication method of clause 23, wherein the second element includes at least one of a preamble identifier, TC_RNTI, UL (uplink) Grant, or a TA command.

26. The wireless communication method of clause 23, wherein the PDSCH includes a mac structure including multiple MAC sub PDUs.

27. A communication apparatus comprising a processor configured to implement a method recited in any one or more of clauses 1 to 26.

28. A computer readable medium having code stored thereon, the code, when executed, causing a processor to implement a method recited in any one or more of clauses 1 to 26.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, including:
sending, by a user device, a first message (msgA) to a network device in a wireless network to initiate a 2-step random access to the wireless network; and
receiving, in response to the first message, a second message (msgB) to perform the 2-step random access, the second message including a physical downlink shared channel (PDSCH) and a physical downlink control channel (PDCCH) associated with a msgB radio network temporary identifier (msgB-RNTI), the PDSCH being scheduled by a downlink control information (DCI) scrambled by the msgB-RNTI,
wherein the DCI scrambled by the msgB-RNTI has a total payload size equal to a legacy DCI format scrambled by a temporary cell radio network temporary identifier (TC-RNTI),
wherein the DCI scrambled by the msgB-RNTI includes a field that is reinterpreted from at least one bit that is defined as an empty bit or a reserved bit in the legacy DCI format and indicates whether a transport block size of a payload of the second message is scaled and a scaling factor for the second message.

2. The wireless communication method of claim 1, wherein the DCI scrambled by the msgB-RNTI has a different structure from that of the legacy DCI format.

3. The wireless communication method of claim 1, wherein the PDSCH includes either a first element corresponding to a response to a reception of a PUSCH (Physical Uplink Shared Channel) included in the first message and a successful decoding of the PUSCH, or a second element corresponding to a response to a reception of a preamble sequence in the first message but an unsuccessful decoding of the PUSCH, wherein the first element includes at least one of a contention resolution ID, C-RNTI assigned for the user device, or a TA (Timing Advance) command, wherein the second element includes at least one of a preamble identifier, TC_RNTI, UL (uplink) Grant, or a TA command, and wherein the PDSCH includes a mac structure including multiple MAC sub PDUs.

4. A wireless communication method, including:

receiving, by a network device, a first message (msgA) from a user device in a wireless network to initiate a 2-step random access to the wireless network; and sending, in response to the first message, a second message (msgB) to perform the 2-step random access, the second message including a physical downlink shared channel (PDSCH) and a physical downlink control channel (PDCCH) associated with a msgB radio network temporary identifier (msgB-RNTI), the PDSCH being scheduled by a downlink control information (DCI) scrambled by the msgB-RNTI, wherein the DCI scrambled by the msgB-RNTI has a total payload size equal to a legacy DCI format scrambled by a temporary cell radio network temporary identifier (TC-RNTI), wherein the DCI scrambled by the msgB-RNTI includes a field that is reinterpreted from at least one bit that is defined as an empty bit or a reserved bit in the legacy DCI format and indicates whether a transport block size of a payload of the second message is scaled and a scaling factor for the second message.

5. The wireless communication method of claim 4, wherein the DCI scrambled by the msgB-RNTI has a different structure from that of the legacy DCI format.

6. The wireless communication method of claim 4, wherein the PDSCH includes either a first element corresponding to a response to a reception of a PUSCH Physical Uplink Shared Channel) included in the first message and a successful decoding of the PUSCH, or a second element corresponding to a response to a reception of a preamble sequence in the first message but an unsuccessful decoding of the PUSCH, wherein the first element includes at least one of a contention resolution ID, C-RNTI assigned for the user device, or a TA (Timing Advance) command, wherein the second element includes at least one of a preamble identifier, TC_RNTI, UL (uplink) Grant, or a TA command, and wherein the PDSCH includes a mac structure including multiple MAC sub PDUs.

7. A communication apparatus comprising at least one processor configured to implement a method comprising:

sending a first message (msgA) to a network device in a wireless network to initiate a 2-step random access to the wireless network; and receiving, in response to the first message, a second message (msgB) to perform the 2-step random access, the second message including a physical downlink shared channel (PDSCH) and a physical downlink control channel (PDCCH) associated with a msgB radio network temporary identifier (msgB-RNTI), the PDSCH being scheduled by a downlink control information (DCI) scrambled by the msgB-RNTI, wherein the DCI scrambled by the msgB-RNTI has a total payload size equal to a legacy DCI format scrambled by a temporary cell radio network temporary identifier (TC-RNTI), wherein the DCI scrambled by the msgB-RNTI includes a field that is reinterpreted from at least one bit that is defined as an empty bit or a reserved bit in the legacy DCI format and indicates whether a transport block size of a payload of the second message is scaled and a scaling factor for the second message.

8. The communication apparatus of claim 7, wherein the PDSCH includes either a first element corresponding to a response to a reception of a PUSCH (Physical Uplink Shared Channel) included in the first message and a successful decoding of the PUSCH, or a second element corresponding to a response to a reception of a preamble sequence in the first message but an unsuccessful decoding of the PUSCH, wherein the first element includes at least one of a contention resolution ID, C-RNTI assigned for the communication apparatus, or a TA (Timing Advance) command, wherein the second element includes at least one of a preamble identifier, TC_RNTI, UL (uplink) Grant, or a TA command, and wherein the PDSCH includes a mac structure including multiple MAC sub PDUs.

9. The wireless communication method of claim 1, wherein the at least one bit reinterpreted as the field comprises a TPC command for scheduled PUCCH field, and wherein a TPC command for the user device is provided within a SuccessRAR element of the PDSCH.

10. The wireless communication method of claim 4, wherein the at least one bit reinterpreted as the field comprises a TPC command for scheduled PUCCH field, and wherein a TPC command for the user device is provided within a SuccessRAR element of the PDSCH.

11. The communication apparatus of claim 7, wherein the at least one bit reinterpreted as the field comprises a TPC command for scheduled PUCCH field, and wherein a TPC command for the communication apparatus is provided within a SuccessRAR element of the PDSCH.

* * * * *